Aug. 1, 1933.  J. N. PEPIN  1,920,430
AUTOMATIC SOUND REPRODUCER
Filed May 27, 1929  6 Sheets-Sheet 1

Inventor.
Joseph N. Pepin.
By Harry C. Alberts
Atty.

Fig. 5.

Aug. 1, 1933.    J. N. PEPIN    1,920,430
AUTOMATIC SOUND REPRODUCER
Filed May 27, 1929    6 Sheets-Sheet 6

Inventor.
Joseph N. Pepin.
By Harry C. Alberts
Atty.

Patented Aug. 1, 1933

1,920,430

UNITED STATES PATENT OFFICE 1,920,430

AUTOMATIC SOUND REPRODUCER

Joseph N. Pepin, Chicago, Ill., assignor to G. Curtis Bird, Wilmette, Ill.

Application May 27, 1929. Serial No. 366,282

21 Claims. (Cl. 274—10)

This invention relates to sound reproducing devices and more particularly to automatically operated devices for disc records, although certain features thereof may be employed with equal advantage for other purposes.

It contemplates more especially the provision of an improved sound reproducing device which is automatic in operation, compact and simple in construction.

One object of the present invention is to simplify the construction and improve the operation of devices of the character mentioned.

Another object is the provision of an improved automatic sound reproducing device which is simple, compact, and dependable in operation.

Still another object is the provision of an automatic record playing device which is compact and of increased capacity for rendering selections.

A further object is to provide a simple and inexpensive record reproducing mechanism which is automatic in operation, dependable, and durable.

A still further object is the provision of means for transferring records to and from a reproducing mechanism with one inversion thereof incident to each complete transfer.

Still a further object is the provision of an automatic record reproducing mechanism which is compact, inexpensively constructed, and of increased playing capacity.

Other objects and advantages will appear from the following description of an illustrated embodiment of the present invention.

The structure selected for illustrating comprises a suitable platform 10 serving as a top for a cabinet 11 of rectangular configuration which conceals the operating and amplifying apparatus employed in connection with an automatic sound reproducing device of the character mentioned. A turntable 12, in this instance of circular shape, is fitted with the usual axially disposed spindle 13 which projects therethrough for rotation in unison therewith. To this end, that portion of the spindle 13 which extends below the turntable 12 is journalled in suitable bearings proximate to one side of the cabinet 11, thereby rotatably sustaining the turntable 12 in spaced relation therewith for rotation in a manner to be described more fully hereinafter.

The portion of the spindle 13 which extends above the turntable 12, is adapted to project through the usual axial aperture 14 provided in disc records of standard construction, thereby aligning and retaining the rotating record 15 in playing position against the urge of centrifugal force. The cabinet 11 is provided therein with a record playing power unit, in this instance an electrical motor 16 of any approved or standard construction which is fitted with the usual gearing or pulleys 17 and 18 inter-connected by an endless belt 19. The usual centrifugal governor and regulating brake mechanism is provided in a suitable housing 20 to regulate the speed of the turntable 12 in the customary and well known manner. The record playing power unit consisting of the motor 16 with the accessory elements described in connection therewith, depend from a circular plate 21 which is supported within a circular opening 22 provided in the platform 10 by circumferentially spaced brackets 23, in this instance four. The brackets 23 extend inwardly from the periphery of the platform opening 22 to receive suitable fasteners 24 which securely engage the plate 21 to enable a detachable joinder with the platform 10 so that the entire playing unit may be readily removed for repairs or replacement.

A sound box 26 communicates with a tone arm 27 of any standard or suitable construction. The tone arm 27 is pivoted at its free extremity for vertical oscillatory movement owing to pins 28 which project therethrough for support by the confronting walls of a U-shaped bracket 29. The bracket 29 is pivotally secured to a boss 30 for horizontal oscillation with respect thereto. The vertically extending boss 30 is provided with a base flange 32 to enable its secural to the platform 10 by means of any suitable fasteners 33 extending therethrough at uniform circumferentially spaced intervals. The sound box 26 includes the usual needle or stylus 34 which projects therefrom in any suitable manner to afford engagement with the continuous spiral sound groove 35 impressed in the record 15. As a consequence, the horizontal oscillatable movement of the tone arm 27 enables the traverse of the stylus 34 for the entire extent of the record groove 35 responsive to rotation of the turntable 12.

The power source 37 is connected to the turntable motor 16 through the medium of an automatic switch which controls the record changing apparatus in timed relation therewith in a manner to be more fully described hereinafter. The record changing instrumentalities comprise, in this instance, a magazine or carrier defined by upstanding circularly shaped guides 38, in this instance three, which are disposed along normal diametrical lines for secural to a plate 39. The plate 39 is apertured for presenting an opening 40 so that the guides 38 may extend from the periphery thereof to align a plurality of standard records 15, eighteen or more, in vertical contacting stacked relation, for support on the plate 39. To this end, the plate 39 is supported on the platform 10 in any suitable manner so that the surface thereof is sufficiently above the record receiving surface of the turntable 12 to enable the lowermost record 15 confined in the carrier or magazine defined by the upstanding guides 38 to be slidably transferred therefrom in a horizontal plane just above the turntable spindle 13. This is accomplished in the present embodiment, by a reciprocating record edge engaging latch 41 (Figures 3 and 9) which is pivotally mounted on a pin 42 carried by a bracket 43. The bracket 43 is provided, in this instance, with a T-groove 44 which is complemental to a correspondingly shaped bar 45 for slidable engagement therewith. The bar 45 is disposed along a longitudinal median line of the platform 10 beneath the carrier or magazine plate 39 for alignment with the axes of the turntable and records 15 vertically stacked in contacting relation for support on the carrier 39.

Figure 10:
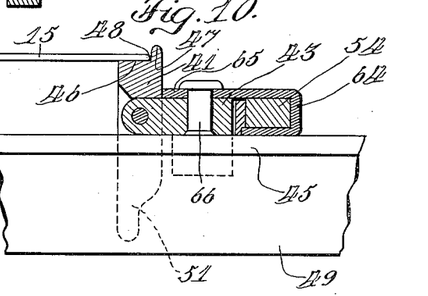
Figure 10 is a sectional view taken substantially along line X—X of Figure 3.
Figures 11, 12, 16:
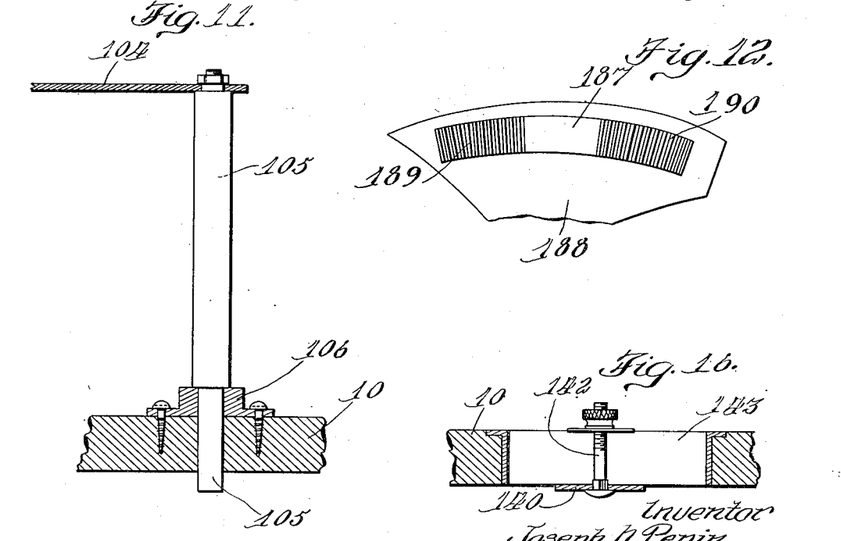
Figure 11 is a sectional view taken substantially along line XI—XI of Figure 3.
Figure 12 is a sectional view taken substantially along line XII—XII of Figure 1.
Figure 16 is a section taken longitudinally of the slot 143 shown in Figure 4.
Figure 13:
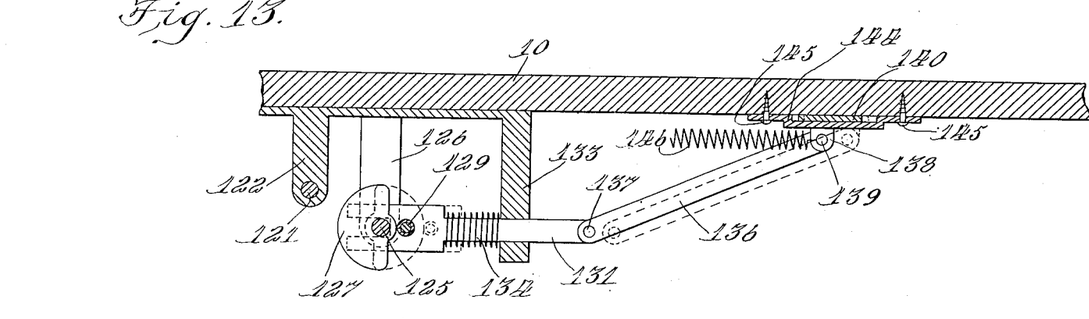
Figure 13 is a sectional view taken substantially along line XIII—XIII of Figure 4.
Figures 14, 15:
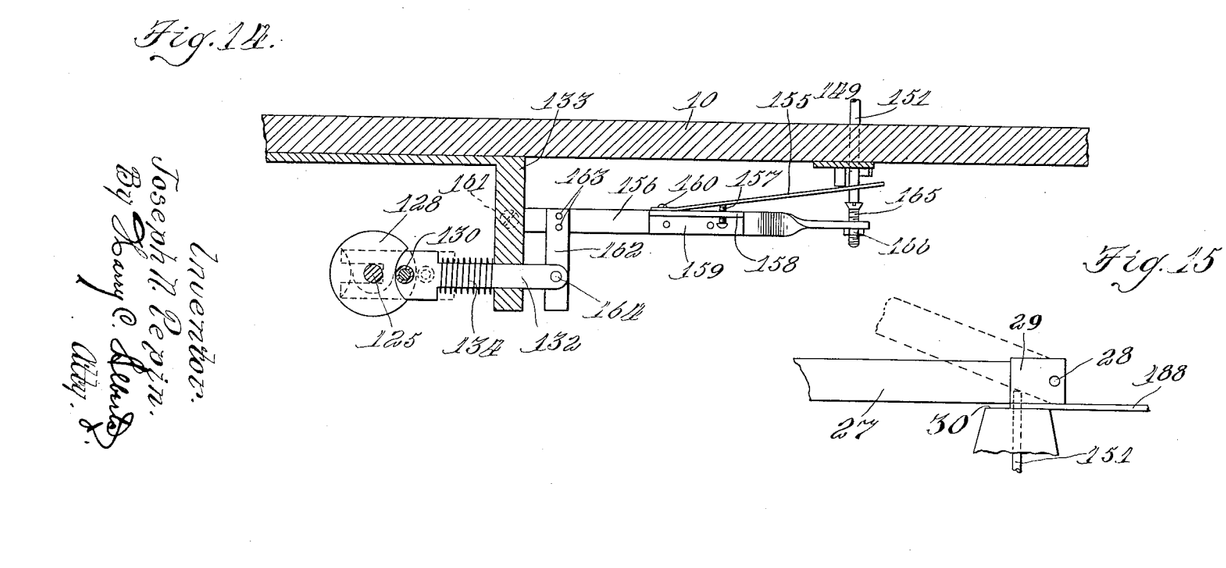
Figure 14 is a sectional view taken substantially along line XVI—XVI of Figure 4.
Figure 15 is a side view in elevation of a tone arm and its pivotal elevating connection.

As shown, the latch 41 pivots about the pin 42 in the direction of its slidable movement, and in its upright or operative position provides a resting surface 46 to receive the lowermost record 15 thereon so that an upstanding ledge 47 thereof will engage the record edge 48 (see Figure 10) to effect the slidable transfer thereof toward the turntable 12. In consequence thereof, the latch guide bar 45 is supported directly on the platform 10 with the web 49 thereof of sufficient depth to maintain the record engaging surface 46 of the latch 41 in the plane of spaced record sustaining guides 50 secured to the platform 10.

Figure 9:
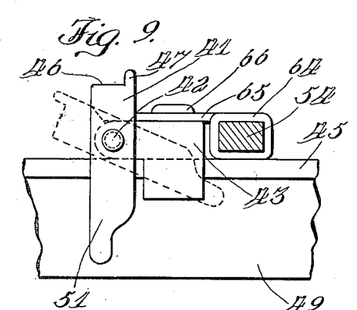
Figure 9 is a sectional view taken substantially along line IX—IX of Figure 3.

With the delivery of a record 15 from the carrier 39, the latch 41 is caused to recede from the turntable 12 to its most remote initial position, thereby encountering the stacked records 15 to slide thereunder in an inclined position (Figure 9). The latch 41 has a depending extension 51 which is disposed in the path of a lug or trip mechanism 52 secured to the platform 10 below the carrier 39 by means of fasteners 53 at the position of the extreme movement of the latch 41 to rectify its position for engaging the edge 48 of the succeeding lowermost record 15. Reciprocation of the latch 41 is effected by means of an oscillating bar 54 which has a depending pin 55 fixed to the extremity thereof for extension through a bearing 56. The bearing 56 has a plate 57, in this instance of rectangular shape, permanently joined thereto for enabling its fixed secural to the platform 10 by means of suitable fasteners 58.

Figure 4:
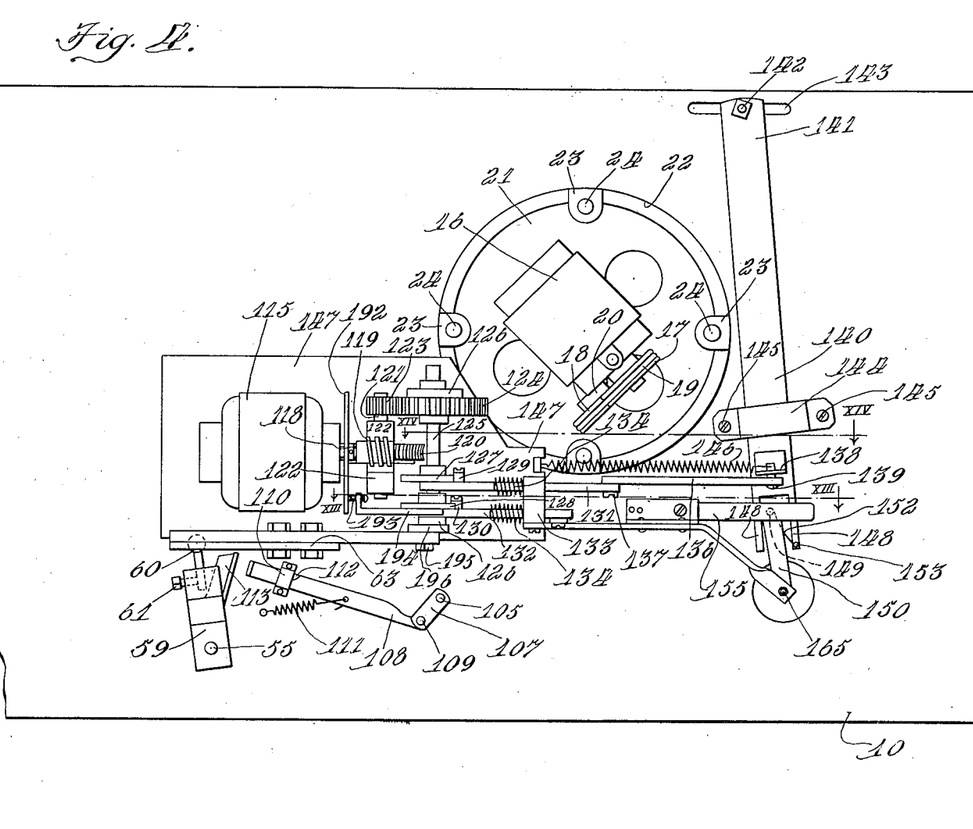
Figure 4 is a bottom view of the device disclosed in Figure 3.
Figures 5, 6:
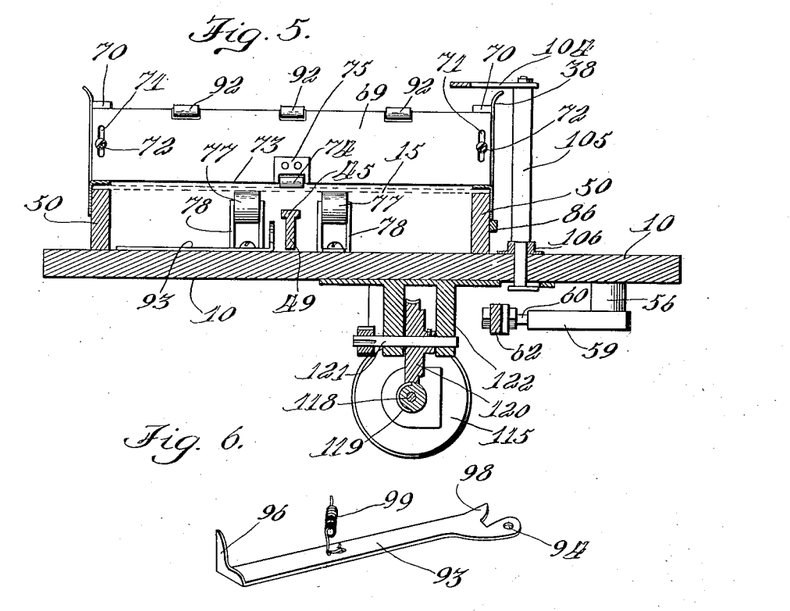
Figure 5 is a sectional view taken substantially along line V—V of Figure 3.
Figure 6 is a perspective view of a record retracting member shown in Figure 3.
Figure 7:
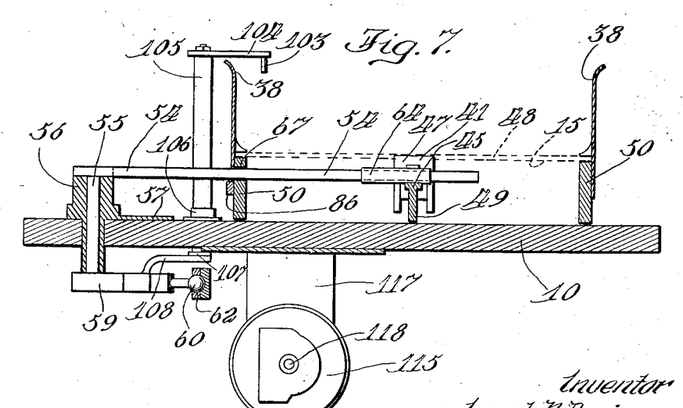
Figure 7 is a sectional view taken substantially along line VII—VII of Figure 3.
Figure 8:
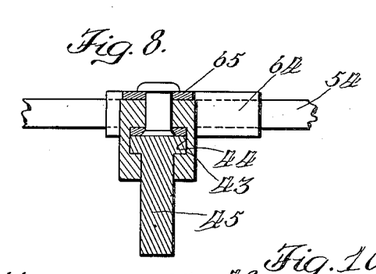
Figure 8 is a sectional view taken substantially along line VIII—VIII of Figure 3.

A member 59 is secured to the pin 55 beneath the platform 10 (Figures 4 and 7) to carry a spherical extension 60 detachably fixed thereto by a set screw 61. The spherical extension 60 is complemental to a correspondingly shaped socket 62 provided in a split connecting rod 63 to establish a universal connection therebetween. Reciprocation of the rod 63 in a manner to be more fully described hereinafter will, therefore, impart oscillatory movement to the bar 54 which has a slidable sleeve 64 thereon. The sleeve 64 has a lug 65 formed thereon for extension transversely of the bar 54 to confront the latch bracket 43 for pivotal association therewith owing to a riveted pin connection 66. It will be obvious, therefore, that oscillatable movement of the bar 54 will reciprocate the record edge engaging latch 41 for slidable movement on the guide bar 45 to transfer the lowermost record 15 to the turntable 12 over the spaced sustaining members 50. It is to be noted that the oscillatable bar 54 extends through an elongated slot 67 in the record sustaining member 50 adjacent thereto to permit its movement in a plane below the carrier 39.

The carrier 39 and turntable 12 are separated by a transverse plate 69 which is supported in position by uprights 70 secured to the transferring record sustaining members 50. Slots 71 are provided proximate to the edges of the plate 69 to receive screw fasteners 72 therethrough for secural to the uprights 70, thereby affording vertical adjustment so that the lower edge 73 thereof may be positioned any fixed distance above the sustaining surface of the members 50.

A roller 74, preferably of yieldable material such as rubber, is mounted for rotation on a bracket 75 secured to the lower edge 73 of the plate 69 intermediate the ends thereof to frictionally engage the record 15 in its transfer from the carrier 39 to the turntable 12. A pair of rollers 77 also of yieldable material are rotatably mounted in brackets 78 secured to the platform 10 immediately adjacent to the plate 69 on the carrier side thereof to cooperate with the sustaining guides 50 in transferring the lowermost record 15 underneath the confronting roller 74 for disposition on the turntable 12. The spacing of the roller 74 with respect to the rollers 77 limit the transfer or passage to a single record 15; however, the spacing may be varied by vertically adjusting the partition bar 69 as previously described.

Prior to slidably transferring the lowermost record 15 from the carrier 39, the record 15 on the turntable 12 which has been reproduced is transferred to the top of the record stack in the carrier 39. This is preferably effected incident to the inversion of the record 15 during the interim of transfer from the turntable 12 to the carrier 39. To this end, the turntable 12 is somewhat smaller in diameter than the record 15 so that elevating members 80 having blades 81 of arcuate outline 82 conforming in curvature with the periphery of the turntable 12 may be fitted thereto. The blades 81 are normally disposed in the plane of the turntable 12 to receive the edge of the record 15 disposed thereon. In this instance, the elevating members terminate in a hub 83 for secural to a shaft 84 which is journalled in the confronting spaced members 50 proximate to the extremities thereof.

One of the elevating members 80 is provided with an extension 86 to carry a pin 87 for pivotally connecting a lever 88 thereto. The lever 88 is slidably guided in a bracket 89 which is fixed to the adjacent record transfer sustaining member 50 to extend therealong. A stud 90 threadedly engages the edge of a lever 88 to carry a roller 91 disposed in the path of the oscillatable bar 54 which impinges thereagainst responsive to the clockwise movement thereof (viewed from Figure 3). The lever 88 will move toward the right to impart clockwise movement to the elevating members 80 (viewed from Figure 1), thereby tiltably transferring the record 15 from the turntable 12 over the partition member 69 which is fitted with yieldable edge buffer rollers 92, in this instance three.

Figure 3:
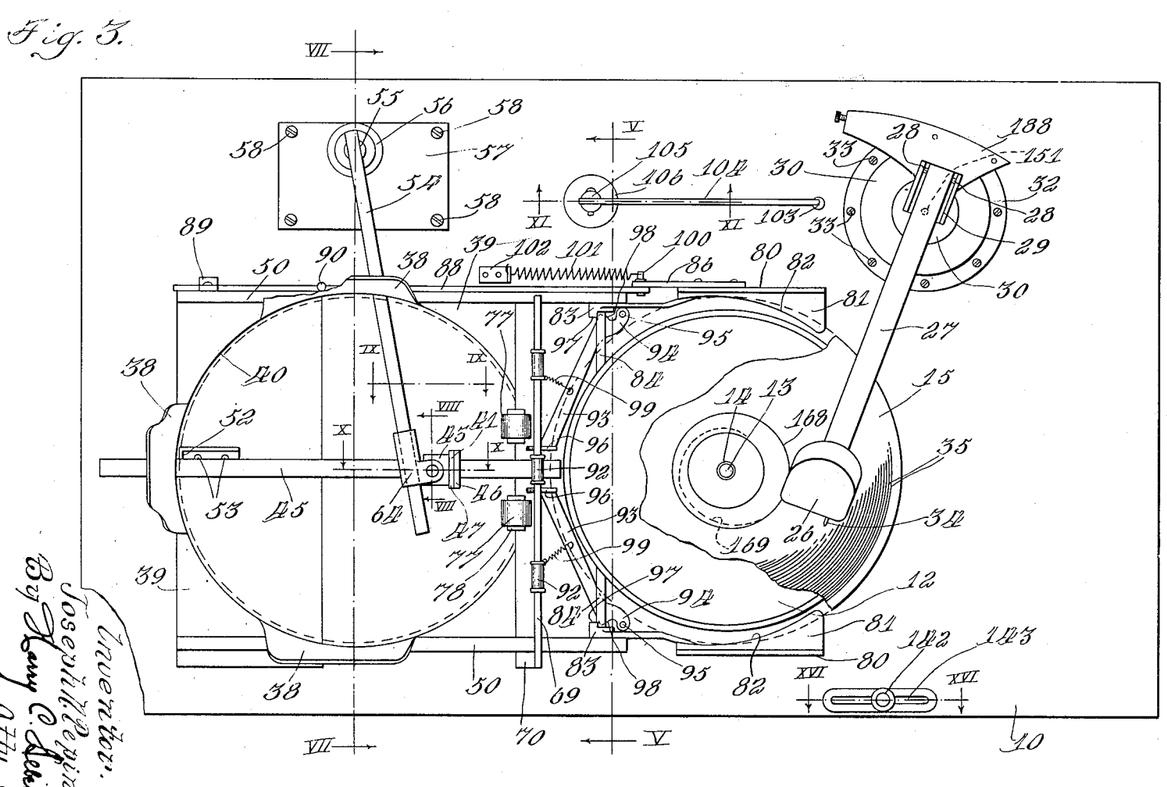
Figure 3 is a plan view of the device disclosed in Figure 1.

The lower tilting edge of the record 15 thus transferred, simultaneously recedes from the partition member 69 owing to a pair of levers 93 which are pivoted at their extremities 94 to the platform 10 beneath the shaft 84 by means of studs 95. The levers 93 terminate in upstanding detents 96 which engage the edge of the record 15 on the turntable 12 responsive to the opposed pivotal movement of the levers 93 toward the tone arm 27 (Figure 3). This is occasioned by the camming surfaces 97 formed on the hubs 83 to engage the ears 98 constituting an integral portion of the levers 93 near their extremities 94. Coil springs 99 are interposed between the levers 93 and partition plate 69 to normally retain the record edge engaging detents 96 in initial position with the ears 98 in constant contact with the camming surfaces 97.

As a consequence, the record 15 on the turntable 10 will be elevated by the blades 81 whereupon the tilting edge thereof will be caused to recede from the plate 69 a sufficient distance to permit the conveyance thereof over the plate 69 to the top of the record stack confined in the carrier 38—39. It is to be noted that the record 15 is inverted during this transfer so that the selections on both sides thereof will be reproduced, thereby materially increasing the capacity of the device without impairing the simplicity or compactness thereof. A pin 100 is carried by the elevator extension 86 below the shaft 84 about which it pivots so as to enable a coil spring 101 to be anchored thereto. The other end of the spring 101 is anchored to a bracket 102 fixed to the platform 10 distant therefrom to tension the elevator members 80 in a counter-clockwise direction (viewed from Figure 1), thereby urging the instrumentalities to initial position and maintaining the trip roller 91 in the path of the oscillatable arm 50.

The record 15 which is tiltably transferred to the top of the carrier stack, is aligned thereon by an edge engaging pin 103 depending from the extremity of a lever 104. The lever 104 is fixed to a post 105 which is journalled in a bearing 106 carried by the platform 10. The post 105 extends through the platform 10 for fixedly receiving a link 107 therebelow. The link 107 is pivotally secured to a lever 108 as at 109 so that slidable movement imparted thereto will rotate the post 105 to cause the pin 103 to engage the record for placing it in alignment upon the stack of records within the magazine or carrier 38—39. As shown, the lever 108 is slidable in a bracket 110 secured to the underside of the platform 10 (Figure 4), there being a coil spring 111 secured thereto and the platform 10 to normally urge the lever 104 in a counter-clockwise direction (viewed from Figure 3). A tang 112 is struck from the lever 108 to limit the movement thereof in the direction of the bracket 110 so that the extremity thereof may be engaged at predetermined intervals by a cam 113 which is fixed to the member 59 to oscillate therewith at the instance of the connecting rod 63 as will more clearly appear hereinafter.

The record changing instrumentalities are, in this instance, driven by an independent electric motor 115 which is supported by suitable brackets 116 depending from standards 117 fixed to the underside of the platform 10. The motor 115 has the armature 118 thereof provided with a worm 119 which meshes with a worm wheel 120 fixed to a shaft 121 journalled in a bracket 122. The shaft 121 carries a spur pinion 123 which in turn meshes with a gear 124 carried by a shaft 125 journalled in depending standards 126. The shaft 125 carries a plurality of cams 127 and 128, in this instance two, which impart reciprocal movement to followers 129 and 130, respectively. The cam followers 129 and 130 are carried by pitmen 131 and 132, respectively which are slidably supported in standards 133 depending from the underside of the platform 10. The follower 129 and 130 are maintained in contact with their respective cams 127 and 128 by means of coil springs 134 which encircle the pitmen 131 and 132 with one extremity of each secured thereto and the other bearing against the standards 133. As a consequence reciprocal movement will be imparted to the pitmen 131 and 132 in accordance with the particular cams 127 and 128 which govern the throw and timing thereof.

The pitman 131 has a link 136 pivoted thereto as at 137 with the other end thereof secured to a bracket 138 through the medium of a pin 139. The bracket 139 is fixed to a bar 140 distant to the pivoted extremity 141 thereof about a stud 142 projecting through a slot 143 in the platform 10. The stud 142 is adjustable along the slot 143 to enable the position of the bar 140 to be varied as a factor of its oscillatable movement occasioned by the reciprocation of the pitmen 131. A strap 144 is secured to the platform 10 by means of fasteners 145 so as to define limits for the oscillatory movement of the bar 140 which is normally urged in a clockwise direction (viewed from Figure 4) by a coil spring 146 having one extremity secured to the pin 139 with the other fixed to a plate 147 constituting the medium through which the entire record changing power unit is secured to the underside of the platform 10.

The free oscillating extremity of the bar 140 is provided with furcations 148 to receive a follower 149 therebetween. The follower 149 is carried by a link 150 which is secured to a rod 151 about which the tone arm 27 is pivoted for oscillation in a horizontal plane. In view thereof oscillatory movement of the bar 140 will impart similar movement to the tone arm 27 to properly return it to initial position outwardly so that the stylus 34 will confront the periphery of the record 15 on the turntable 12 during the record changing operation.

A wire spring 152 is anchored at one extremity 153 thereof to a furcation 148 of the bar 140 so that the free extremity thereof will engage the follower 149 to return the tone arm 27 a slight distance inwardly of the record periphery for aligning the stylus 34 with the initial turn of the record groove 35. The follower 149 for governing the horizontal oscillatory movement of the tone arm 27 is freely movable between the furcations 148 to permit the tone arm 27 to follow and traverse the entire extent of the record groove 35. To prevent free swinging movement of the tone arm 27 toward the center of the turntable 12, a leaf spring 155 carried by a lever 156 is in frictional engagement with the follower 149, thereby holding the sound box 26 with its stylus 34 in readiness for descent in engagement with the initial turn of the record groove 35.

The friction exerted at the instance of the leaf spring 155 may be varied by a set screw 157 which threadedly extends through the flange 158 of a bracket 159 riveted or otherwise secured to a lateral face of the link 156. The spring 155 is anchored by means of a rivet or other fastener 160 at one extremity thereof to urge the free end thereof in contact with the follower 149.

The engagement of the stylus 34 with the record groove 35 incident to its descent in confronting relation with the initial turn thereof and its ascent at the groove terminus is governed by the link 156 which is pivoted at one extremity thereof to the depending standard 133 as at 161.

An arm 162 is fixed to the link 156 by means of fasteners 163 for extension normal thereto in confronting relation with the extremity of the pitman 132, there being a pin 164 extending therethrough to establish a pivotal connection therebetween. Reciprocal movement of the pitman 132 will, therefore, pivot the link 156 about the pin 161 to effect the ascent or descent of a set screw 165. The set screw 165 is in threaded engagement with the extremity of the link 156, it being locked in position by a nut 166 so as to engage the extremity of the rod 151. The rod 151 is operatively connected to the tone arm 27 for axial extension through the supporting boss 30, thereby causing the ascent and descent thereof at predetermined intervals about the pin 28 responsive to corresponding movement of the adjustable stop 165.

To reiterate, in addition to the horizontal oscillatory movement of the tone arm 16 about the rod 151 for enabling the stylus 19 to traverse the extent of the record groove 35, it has vertical oscillatory movement about the pin 28 at predetermined intervals. The mechanism heretofore described for reproducing and automatically changing sound records 15, is set in motion and controlled by the tone arm 27 which is arranged, in this instance, to encounter a stop or be subject to a predetermined motion depending upon the particular terminus groove 168 or 169, eccentric or spiral, respectively, that is employed on various records 15 now produced for sale to the trade. This timed functioning of the reproducing and record changing apparatus is responsive to a switching mechanism confined in a casing 170 which is fixed to the platform 10 rearwardly of the tone arm 27 in any suitable manner.

The switch casing has an open top defined by the upper peripheral edge 171 thereof to enable the insertion of switch elements therein. An insulator plate 172 is secured to an interior wall thereof to sustain electrical contact terminals 173 and 174 secured in spaced position by threaded fasteners 175.

Independent circuit wires 176 and 177 are electrically connected by the studs 175 to the contact terminals 173 and 174, respectively. A switch terminal 178 is secured to the extremity of a bar 179 for movement along an arc in the path of the terminals 173 and 174 to selectively contact with one or the other thereof, thereby independently energizing the electrical circuits which provide power for the reproducing and record changing instrumentalities in timed sequential alternation or relation. In consequence thereof, the terminal switch mounting bar 179 is pivotally supported on a pin 180 carried by the insulator plate 172, there being a slot 181 in the bar 179 to enable the longitudinal movement thereof within the limits of the slot 181 for a purpose which will more clearly appear hereinafter. The bar 179 is held in position and its rotary or oscillatory movement limited to insure contacting registry between the terminals 178 and 173 or 174 owing to a link 182. The link 182 is pivotally anchored at one extremity thereof to the plate 172 by means of a pin 183 positioned along a vertical median line below the pin 180. The other extremity of the link 182 is pivotally connected to the bar 179 as at 184 to limit the throw thereof on either side for exact registry and contact with the terminals 173 and 174.

As shown, the switching bar has an extension 185 protruding through the open top of the casing 170 to receive a cap 186 on the extremity thereof. The cap 186 is rounded or otherwise shaped to normally contact with a quadrant or sector 187 which is curved to correspond with the circular path, it being fixed to the underside of a plate 188. The plate 188 constitutes a rearward extension of the tone arm 27 and oscillates in unison therewith to create relative movement between the cap 186 on the bar 179 and the sector 187 which is in frictional contact therewith. A coil spring 179a is tensioned between the pins 180 and 184 to normally urge the cap 186 toward the sector 187 to establish yielding frictional contact therebetween. The contacting surface of the sector 187 is provided with teeth 189 and 190 or otherwise roughened proximate to the ends thereof to effect the throw of the switch bar 179 from one contact terminal 173 to the other contact terminal 174 or vice versa.

Figures 1, 2:
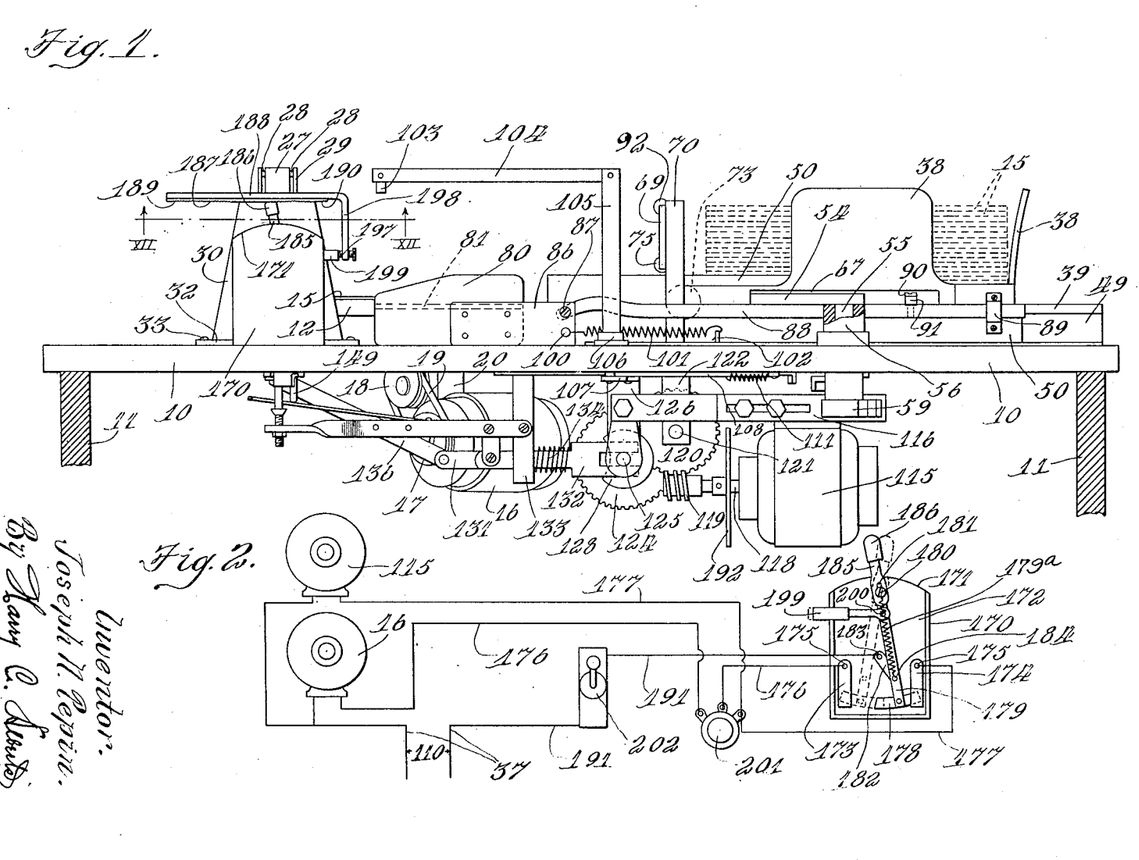
Figure 1 is a rear view in elevation of a device embodying features of the present invention.
Figure 2 is a diagrammatic view of an electrical circuit for the automatic devices disclosed in Figure 1.

It will be noted that the switch terminal 178 is connected to the other side of the line 37, by a wire 191, thereby energizing the motor 16 or 115 depending upon contact between the switch bar terminal 178 and 173 or 174, respectively. This automatic switching occurs when the sound box 26 has approached the extreme positions of its traverse, since movement of the tone arm 27 in a clockwise direction (viewed from Figure 3) incident to the operation of the motor 16 which rotates the turntable 12 so that the stylus 34 follows the record groove 35, will cause the switch bar cap 186 to slide over the sector 187 in contact with the teeth 190 (Figure 1).

The teeth 190 are inclined in the directional movement thereof to enable the cap 186 to readily slide thereover. Any predetermined change in movement of the tone arm 27 such as a slight reversal or backward movement thereof as occasioned by the traverse of the stylus 34 in the groove eccentric terminus 168 (Figure 3), will throw or flip the switch bar 179 to its full line position (Figure 2) for energizing the motor 115 which operates the record changing instrumentalities heretofore described.

With the starting of the motor 115, the pitman 132 is first reciprocated to elevate the tone arm 27 through the lever 156 which carries a stud 165 in supporting engagement with the lifting pin 151 connected to the tone arm 27 which pivots upwardly about the pin 28. The pitman 131 is thereupon reciprocated to oscillate the bar 140 which cams the follower 149 to impart pivotal movement to its carrier link 150 connected to the rod 151 to effect corresponding pivotal movement of the tone arm 27 in a counterclockwise direction (viewed from Figure 3). The tone arm will thus be moved outwardly beyond the periphery of the record 15 on the turntable 12, whereupon the latch 41 is reciprocated beneath the records 15 in the carrier 38—39 towards its trip 52 by the bar 54 which impinges against the trip 90 to pivot the turntable record elevator members 81 in a clockwise direction (viewed from Figure 1). After partial elevation of the members 81, the camming surfaces 97 provided on their hubs 83, engage the extensions 98 to effect pivotal movement of the members 93 so that the ears 96 thereon will engage the edge of the record 15 which is being tiltably transferred to the top of the record stack confined on the carrier 38—39. The pivotal record edge engaging members 93 causes the tilting edge of the record 15 to recede from the partition plate 69 so as to afford sufficient clearance therewith for inversion of the record 15 prior to its deposit by the elevator member 81 upon the record stack of the carrier 38—39. Thereupon, the lever 104 carrying the depending pin 103 rotates in a clockwise direction (viewed from Figure 3) to engage the edge of the top record on the carrier 38—39 to insure absolute alignment thereon.

During this interim, the latch 41 is tripped behind the lowermost record in the carrier 38—39 so that the upstanding lip 47 thereon will engage the edge of the lowermost record to slidably effect the transfer thereof between confronting rollers 74 and 77 for lodgment upon the turntable 12 responsive to counter-clockwise movement of the bar 54 (viewed from Figure 3). At this time, the pitman 131 is actuated to return the sound box 26 with its stylus 34 within the confines of the record 15 on the turntable 12 so that the wire spring 152 may further effect alignment with the initial turn of the sound groove 35. Now the pitman 132 recedes to lower the set screw 165 carried by the lever 156 so that the tone arm may descend to afford engagement of the stylus 34 with the record groove 35.

It is to be noted that the momentary return of the sound box 26 from a point outside the periphery of the record 15 upon the turntable 12 to align the stylus 34 with the initial turn of the groove 35, is sufficient reverse movement to cause the throw of the switch bar 179. This de-energizes the motor 115 and energizes the motor 16 to effect rotation of the turntable 12 just prior to the descent of the stylus 34 in engagement with the initial turn of the record groove 35.

In order that the moving record changing instrumentalities may be brought to an instant stop when the motor 115 is de-energized, a disc 192 is mounted on the armature shaft 118 so that a frictional member 193 carried by a lever 194, may abut thereagainst to retard rotation thereof when the motor 115 is de-energized. To this end, the lever 194 is fixed to the pitman 132 so as to impart corresponding movement thereto for frictional contact with the disc 192 at predetermined intervals of inactivity. It is to be noted that the connecting rod 63 is secured to a pin 195 eccentrically carried by a disc 196 secured to the shaft 125 to serve as a crank arm which imparts the necessary timed motion to the member 59 for actuating the latch bar 54 and the aligning pin 103 fixed to the post 105.

Now, then, certain standard records 15 have the tone groove 35 impressed on the surface thereof for termination in a spiral 169 (Figure 3) rather than an eccentric 168, and as a consequence the tone arm 27 would not have any reverse movement of the type necessary to throw the switch bar 179 when the stylus 34 has traversed the entire extent of the record groove 35 in the manner described hereinabove. So that the switch bar 179 may be operative with records 15 of this last named construction, an adjustable stop 197 is carried by a bracket 198 depending from the plate 188 in rigid relation therewith. A lug 199 is fixed to the switch bar 179 by a rivet or other fastener 200 to project transversely through the side of the casing 170 in the path of the stop 197 to throw the switch bar 179. This occurs when the stylus 34 rides in the spiral groove 169 after the record groove 35 has been reproduced incident to the traverse of the stylus 34 over the entire extent of the tone groove 35. Any predetermined movement of the tone arm 27 such as a slight reversal or backward movement thereof as occasioned by the traverse of the stylus 34 in the groove eccentric 168 will throw or flip the switch bar 179.

As shown, a two throw button switch 201 is connected to both circuits to render the reproducing mechanism inactive at any point and to immediately render the record changing instrumentalities active, thereby removing the partly played selection and transfering another to the turntable 12. A switch 202 is provided in the power line to render the device operative or inoperative as may be desired.

Various changes may be made in the embodiment of the invention herein specifically described without departing from or sacrificing any advantages thereof as defined in the appended claims.

I claim:

1. In a sound reproducing device, the combination with a rotatable support, of a magazine adapted to receive a plurality of records in horizontal stacked relation, and means for tiltably transferring the record from said support to said magazine responsive to the complete reproduction thereof.

2. In a sound reproducing device, the combination with a rotatable support, of a magazine adapted to receive a plurality of records in horizontal stacked relation, means for overturning a record from said support to effect the transfer thereof to said magazine, and means operative in timed relation with said transferring means to move the lowermost record from said magazine to said support.

3. In a sound reproducing device, the combination with a sound reproducer, of a carrier for receiving records in stacked relation, and means responsive to said reproducer to tiltably remove a record therefrom and slidably receive another from said carrier in timed relation for continuous reproduction.

4. In a sound reproducing device, the combination with a sound reproducing mechanism, of a carrier for receiving a plurality of records in stacked relation, and means operable in timed relation responsive to said reproducing mechanism for overturning the record from said reproducing mechanism to effect the transfer thereof to said carrier and slidably withdraw another therefrom for transfer to said reproducing mechanism.

5. In an automatic sound reproducing mechanism, the combination with a sound reproducing device, of a support adapted to maintain a record in playing engagement with said sound reproducing device, a magazine for retaining a plurality of records in vertical stacked contacting relation, means for transferring a record from said support to the top of said magazine, means for transferring the lowermost record from its contacting relation in said magazine to said support, and means for actuating said support, reproducing device, and transferring means in timed relation for the purpose set forth.

6. In an automatic sound reproducing device, the combination with a rotatable support for a record, a sound reproducing mechanism arranged for operative association with the record on said support, a magazine for retaining a plurality of records in vertical stacked relation, pivoted record elevating means for inverting the record incident to the transfer thereof from said support to said magazine, means for slidably transferring a record from said magazine to said support, and means for actuating said transferring means in timed sequence with said rotatable support.

7. In a sound reproducing mechanism, the combination with a record support, of a carrier adapted to retain a plurality of records in vertical stacked relation, means for inverting the record from said support in the transfer thereof to said carrier, means responsive to said inverting means to retract the lower edge of the record during the inversion thereof, means for slidably withdrawing a record from said carrier for transfer to said support, and means for operating said transferring means in timed sequence.

8. In a sound reproducing device, the combination with a record support, of a carrier adapted to retain a plurality of records in vertical stacked alignment, means for inverting the record from said support to effect the transfer thereof to said carrier, means responsive to said inverting means to retract the lower edge of the record during the inversion thereof, means for aligning the record in said carrier after the transfer has been effected, means for slidably transferring a record from said carrier to said support, and means for operating said transferring means in timed relation.

9. In a sound reproducing device, the combination with a turntable, of a carrier for receiving a plurality of records in vertical stacked relation, reciprocating means for sliding the lowermost record from said carrier to said turntable, pivotal record transferring means normally in the plane of said turntable to elevate a record from said turntable to said carrier, a reproducing mechanism oscillatable vertically and horizontally over said turntable to engage a record thereon at predetermined intervals, and means for operating said reproducing means, reciprocating means and pivotal means in timed relation.

10. In a sound reproducing mechanism, the combination with a turntable, of a carrier for receiving a plurality of records in vertical stacked relation, reciprocating means disposed beneath said carrier, a pivotal record edge engaging latch on said reciprocating means to effect the slidable transfer of a record from said carrier to said turntable, pivoted means for tilting a record from said turntable to said carrier, and means for operating said turntable, reciprocating means and tilting means in timed relation.

11. In an automatic phonograph, a turntable fixed longitudinally of its center of rotation, a reservoir in which records are supported one upon the other, means for moving records successively from said reservoir to said turntable, and means for returning each record after a composition on one side has been played to said reservoir and placing it on the records in said reservoir in reversed position.

12. In an automatic phonograph, a turntable, a reservoir adapted to hold a stack of records placed one upon the other, means for sliding records successively from said reservoir to said turntable, and means for returning each record from said turntable to the reservoir and placing each record in inverted position on the uppermost record in the reservoir.

13. In an automatic phonograph, a turntable, a reservoir adapted to hold a plurality of disk records placed one upon the other, a reciprocatory selector adapted to engage and slide the lowermost record from said reservoir to playing position on the turntable, and means for removing each record from said turntable and restoring it to said reservoir in inverted position.

14. In a phonograph wherein the tone arm carrying a reproducing needle is automatically moved from a point beyond the periphery of a disk record on a turntable and said needle is placed in a sound groove in said record and is subsequently raised from said record and returned to its position beyond the periphery of the record after the latter has been played, the combination of a record receptacle in which the records are supported one upon the other, record feeding means for sliding a record from said receptacle on said turntable in position to have said needle engage a sound groove thereon and means for removing said record from the turntable after the tone arm has been removed beyond the periphery of said record, said record removing means reversing said record and restoring the same to said receptacle in position to have its reverse side engaged by said needle the next time it is placed on the turntable by said record feeding means.

15. In an automatic phonograph, a turntable, a reservoir for a series of disk records supported one upon the other and adapted to be fed by gravity to a position to be successively removed from said reservoir to said turntable, means for removing each record from the turntable after it is played and restoring it to the reservoir, and means for moving the record from the reservoir to turntable, each record being reversed during its movement from the turntable to the reservoir.

16. In an automatic phonograph, a turntable fixed longitudinally of its center of rotation, a reservoir for disk records each provided with a spiral sound groove on each of its opposite sides said records being supported one upon the other, a tone arm carrying a reproducing needle, a main operating shaft for elevating said tone arm and moving it to a point beyond the periphery of the record when said needle has traversed the sound groove on one side of a record on the turntable, means actuated from said shaft for successively sliding said records from said reservoir to said turntable and means operable from said shaft for returning each record from said turntable to said reservoir in reversed position.

17. In a sound reproducing device, the combination with a rotatable support, of a magazine adapted to receive a plurality of records in vertical stacked relation, means for overturning a record from said support to effect the transfer thereof to said magazine, and means operative in timed relation with said transferring means to slidably move the lowermost record from said magazine to said support.

18. In combination, means for transporting a talking machine or phonograph record from a group of superposed records to a sound reproducing position, means for reproducing sound from said record while in said sound reproducing position, and means for depositing said record at the top of said group of superposed records in inverted relation to that occupied thereby during the period of sound reproduction.

19. In combination, means for transporting a talking machine or phonograph record from a stack of records to a sound reproducing position, means for reproducing sound from said record while in said sound reproducing position, and means for depositing said record at the top of said stack of records in inverted relation to that occupied thereby during the period of sound reproduction.

20. In combination, means for successively transporting the respective records defining one end of a stack of records to a sound reproducing position, means for successively reproducing sound from said transported records, and means for successively depositing said transported records at the top of said stack of records in inverted relation to that occupied thereby during the respective periods of sound reproduction.

21. In combination, means for successively transporting to a sound reproducing position the respective lowermost records of a stack of records, means for successively reproducing sound from said transported records, and means for successively depositing said transported records at the top of said stack of records in inverted relation to that occupied thereby during the respective periods of sound reproduction.

JOSEPH N. PEPIN.